United States Patent [19]

Herrington

[11] Patent Number: 4,717,372
[45] Date of Patent: Jan. 5, 1988

[54] APPARATUS FOR PRODUCING A MACHINE-DIRECTION INTERMITTENT HEAT SEAL

[75] Inventor: Fox J. Herrington, Holcomb, N.Y.

[73] Assignee: Mobil Oil Corporation, New York, N.Y.

[21] Appl. No.: 938,894

[22] Filed: Dec. 8, 1986

[51] Int. Cl.⁴ .................... B31B 23/64; B31B 23/86
[52] U.S. Cl. .................... 493/193; 493/208; 493/225; 493/394; 493/928; 156/582; 156/583.1; 156/583.4
[58] Field of Search ............... 493/205, 206, 207, 208, 493/209, 189, 190, 191, 192, 193, 197, 202, 225, 226, 381, 386, 394, 406, 470, 471, 928; 156/582, 583.1, 583.4, 583.7, 583.8, 583.9, 583.91

[56] References Cited

U.S. PATENT DOCUMENTS

| | | | |
|---|---|---|---|
| 2,125,758 | 8/1938 | Waters | 493/197 |
| 2,242,799 | 5/1941 | Moore | 493/208 |
| 2,718,105 | 9/1955 | Ferguson et al. | 493/197 |
| 2,777,491 | 1/1957 | Ashton et al. | 493/226 |
| 2,883,913 | 4/1959 | Piazze | 493/226 |
| 2,893,468 | 7/1959 | Fieroh | 493/225 |
| 2,897,729 | 8/1959 | Ashton et al. | 493/196 |
| 2,971,874 | 2/1961 | Canno | 493/197 |
| 3,029,853 | 4/1962 | Piazze | 383/75 |
| 3,058,402 | 10/1962 | Kugler | 493/196 |
| 3,058,403 | 10/1962 | Kugler | 493/194 |
| 3,406,610 | 10/1968 | Golden | 493/196 |
| 3,414,032 | 12/1968 | Jortikka | 383/26 |
| 3,759,772 | 9/1973 | Andersson | 156/270 |
| 4,140,046 | 2/1979 | Marbach | 493/209 |
| 4,202,721 | 5/1980 | Roberts | 156/358 |
| 4,380,446 | 4/1983 | Dickson et al. | 493/208 |
| 4,558,463 | 12/1985 | Boyd | 493/225 |

FOREIGN PATENT DOCUMENTS

1125363 8/1968 United Kingdom .

Primary Examiner—Frederick R. Schmidt
Assistant Examiner—William E. Terrell
Attorney, Agent, or Firm—Alexander J. McKillop; Michael G. Gilman; Charles J. Speciale

[57] ABSTRACT

Apparatus for producing a machine-direction intermittent heat seal in a moving web of plastic film including a block adapted to be supported on one side of the hem and having a plurality of wheels having heat conducting surfaces spaced around the periphery and mounted on the block at spaced locations in tandem for engaging the film along the path of the intermittent heat seal to be formed in the hem. The block has a corresponding plurality of surfaces each of which is adapted to be engaged by a side of one of the wheels. Gears interconnect the wheels to maintain the wheels in register with the intermittent portions of the heat seal in the hem during rotation of the wheels. A heater is provided for heating the block and its plurality of surfaces and springs are provided for maintaining the wheels in contact with the plurality of surfaces whereby movement of the hem through the heat sealing apparatus causes the plurality of wheels to rotate and maintain contact with the plurality of surfaces whereby the wheels are in turn heated by conduction from the block and produce the intermittent heat seal in the hem.

7 Claims, 11 Drawing Figures

APPARATUS FOR PRODUCING A MACHINE-DIRECTION INTERMITTENT HEAT SEAL

BACKGROUND OF THE INVENTION

This invention relates to apparatus producing a machine-direction intermittent heat seal for sealing a hem in a moving web of film and more particularly to the manufacture of draw tape plastic bags.

Bags made of thin polyethylene materials have been used in various sizes. Small bags are used in the packaging of samples and the like. Larger bags are used as shopping bags; and even larger bags are used for containing trash.

A particularly advantageous closure for such a bag includes a draw tape constructed from the same polyethylene material. U.S. Pat. No. 3,029,853—Piazzi and British Pat. No. 1,125,363—Jortikka are examples of draw tape bags. Such closures have been successfully employed on these bags.

Draw tape closures for large trash bags, and the manufacture of these draw tape trash bags, are described in the related applications identified below.

Forming the hem, into which the tape is inserted is shown for example, in U.S. Pat. Nos. 2,897,729—Ashton et al 3,058,402—Kugler, 3,058,403—Kugler, 4,558,463—Boyd, and in copending patent applications of applicant's assignee including "METHOD AND APPARATUS FOR FORMING HEMS IN SUPERPOSED PLIABLE PANELS," Boyd et al, Ser. No. 652,255, filed Sept. 20, 1984, now U.S. Pat. No. 4,617,008 and in "HEM FOLDER WITH INTEGRAL TAPE INSERTER FOR MAKING DRAW TAPE BAGS," Herrington, Ser. No. 871,238 filed 6/6/86.

Draw tape hems have been previously made by various methods. One method is to use a Teflon-coated hot bar which opens and closes against the film in the area of the bag machine where the film starts and stops. The bar closes once during each cycle while the film is stopped. Either continuous or intermittent seals may be formed by this method. A second method is to blow a series of hot air jets against the film as it travels by. Bag closures for use in the field use a pair of heated belts to produce a machine-direction seal. In the hot bar method, the hot bar is located far downstream from where the tape is inserted into the hem and also where the hem is folded so there has been an opportunity for the tape and the hem to wander by the time it reaches the sealer. This requires making the hem wider to allow for this wandering movement. This is costly in wasted material, produce a weak tape seal at the side edges of the bag, and also makes a sloppy bag. The hot air sealer can be used on continuously moving web, but it is very sensitive to wrinkles. The heating of the film by the air jets also causes some wrinkling which cannot easily be prevented since the film is not mechanically constrained. As a result the hem seals made by these techniques are not reliable, particularly where thin films, in the order one mil, are used.

It is desirable from an economic standpoint that the heat seals be produced while the web of film is moving. Apparatus for heat sealing hems in a web of film moving at a relatively high speed, such as 250-300 feet per minute, are disclosed in the related patent applications identified below. In those applications the heat seal was made with a hot wheel sealer and the seal was continuous throughout the length of the hem. It has been found that a moving web of film is subjected to some transverse as well as machine direction tensions. A transverse tension is sometimes concentrated in local areas, for example adjacent to punched holes through which the draw tapes can be grasped. When the film is heated to make a machine direction seal, it is weakened along a continuous line. Transverse tensions stretch the weakened seal, making it thin and weak, particularly in areas of high transverse tension, such as by the hole. By providing an intermittent or discontinuous heat seal the small interruptions in the heat seal allow the film to retain its integrity so the seal will not become stretched and weak. The gaps in the intermittent seal provide a strong tie across the hot seal, preventing it from stretching. It is an object of the present invention to provide apparatus for producing a machine-direction intermittent heat seal in a moving web of plastic film where the interruptions in the heat seal are relatively small, for example about ¼" long, at intervals of about ¾", resulting in a discontinuous seal having seal lengths about ½" long with ¼" gaps.

It is a further object of the present invention to seal hems with intermittent heat seals in the opposing panels of a moving web of film in the manufacture of draw tape bags.

RELATED APPLICATIONS

APPARATUS FOR SEALING A HEM IN A MOVING WEB OF FILM USING ANGULARLY ORIENTED HOT WHEELS, Herrington et al, Ser. No. 904,449 filed 9/8/86; and APPARATUS FOR PRODUCING A MACHINE-DIRECTION HEAT SEAL, Herrington, Ser. No. 904,444 filed 9/8/86, and APPARATUS FOR SEALING A HEM IN A MOVING WEB OF FILM, Herrington, Ser. No. 904,441 filed 9/8/86.

SUMMARY OF THE INVENTION

In accordance with the present invention there is provided apparatus for producing a machine-direction heat intermittent seal in a moving web of thermoplastic film. The apparatus comprises means adapted to be supported on one side of the web including a plurality of wheels having heat conducting surfaces spaced around the periphery and mounted at spaced locations in tandem for engaging the path of the intermittent heat seal to be formed in the web. Gear means is provided to interconnect the wheels to maintain the spaced heat conducting surfaces of the wheels in register with the intermittent portions of the heat seal in the web during rotation of said wheels. Means is also provided for heating the plurality of wheels whereby movement of the web through the heat sealing apparatus causes the plurality of wheels to rotate and produce an intermittent heat seal in the web. The apparatus also includes means supported on the opposite side of the web for engaging the film along the path of the heat seal to be formed in the the web and cooperating with the wheels in creating the intermittent heat seal. The foregoing apparatus preferably is incorporated in a machine for making bags from thermoplastic film wherein the apparatus for heat sealing a pair of hems in a moving web of the film comprises a first support adapted to be supported on one side of one of the hems. A plurality of wheels having heat conducting surfaces spaced around the periphery is mounted on the first support means at spaced locations in tandem for engaging the film along the path of the heat seal to be formed in the one hem. Gear means is provided to interconnect the wheels to maintain the wheels in register with the intermittent portions of the heat seal in the web during rotation of said wheels. A second support means is adapted to be supported on one side of the second hem, the second support means having a second plurality of wheels having heat conducting surfaces spaced around the periphery and mounted thereon at spaced locations in tandem for engaging the film along the path of a second intermittent heat seal to be formed in the second hem. Second gear means is provided to interconnect the second plurality of wheels to maintain the second plurality of wheels in register with the intermittent portions of the second heat seal in the second hem during rotation of the second plurality of wheels. Means is also provided for heating each of the plurality of wheels whereby movement of the hems through the heat sealing apparatus causes each plurality of wheels to rotate and produce the intermittent heat seals in the hems.

The foregoing and other objects, features and advantages of the invention will be better understood from the following, more detailed description and appended.

DESCRIPTION OF SPECIFIC EMBODIMENTS

Figure 1:
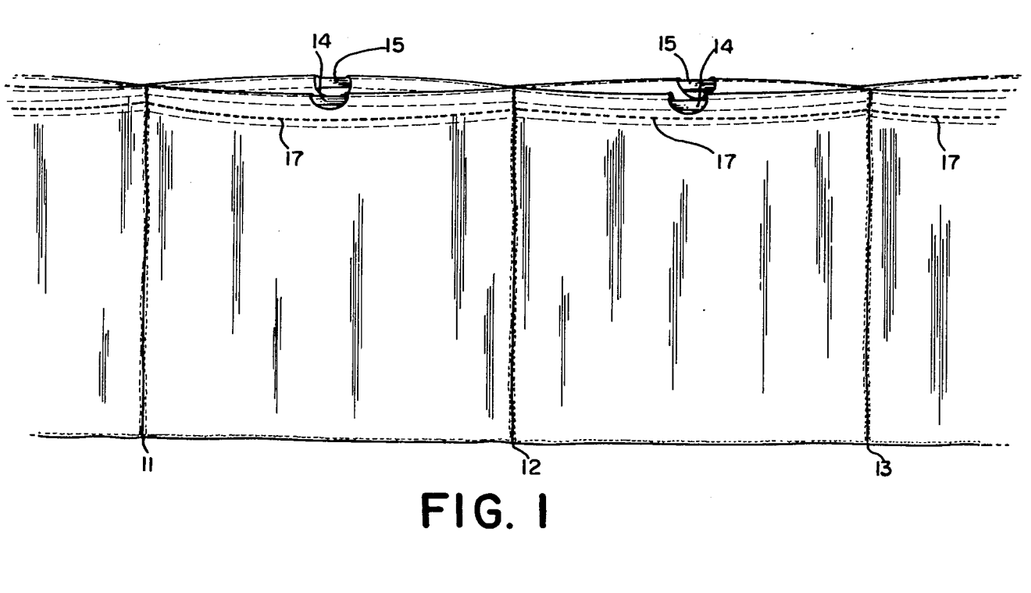
FIG. 1 shows a series of draw tape bags with intermittent heat seals made in accordance with the present invention.

FIG. 1 shows a series of draw tape bags formed from an extruded tube of polyethylene. The tube is slit along one side to form open tops in the bag for reception of trash and the like. The tube of film is folded along the other side to form the bag bottoms. The sides of the panels are heat sealed and cut from the tube in a perpendicular direction at 11, 12 and 13 to form individual bags.

Hemmed portions of each opposing panel are folded over adjacent the top. The draw tape bag construction as thus far described is similar to the draw tape bags disclosed in copending application Ser. No. 871,238. Draw tapes 14 and 15 are inserted in the hems and are secured by an intermittent heat seal 17 or discontinuous at the sides of the panels. Tape holes are cut in each panel exposing the draw tapes so that they can be grasped. The distance from the bottom of the bags to the top is referred to as "web width" or "bag length" herein.

Figure 2:
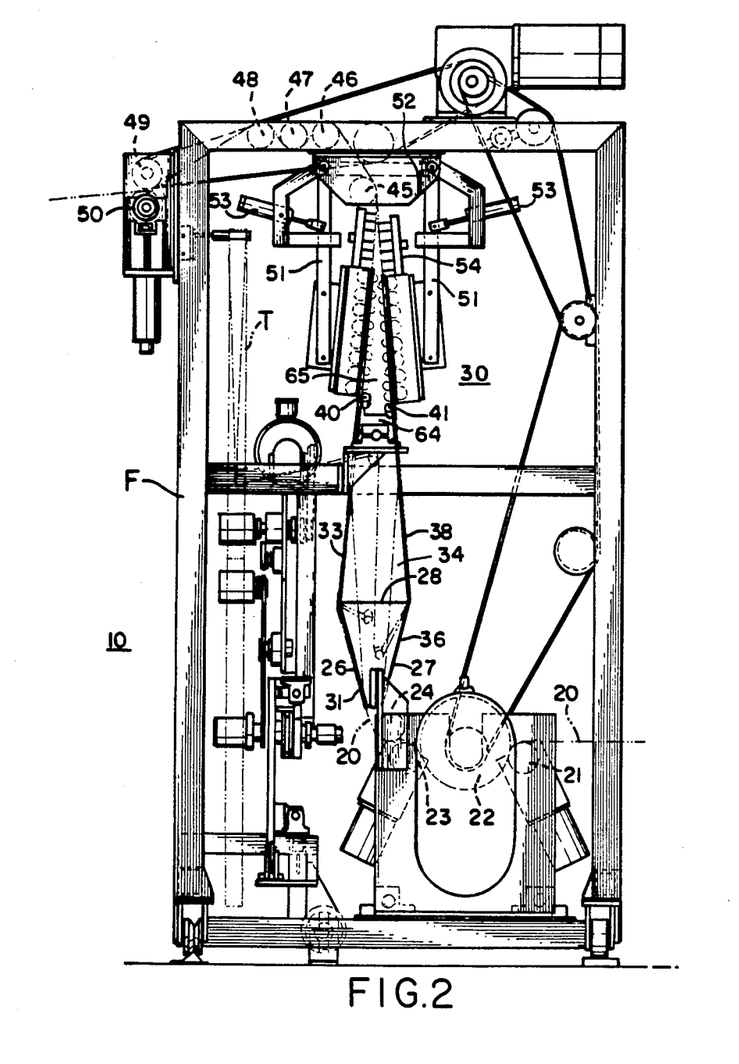
FIG. 2 is a front elevation view of a machine embodying the intermittent heat sealing apparatus of the present invention.

FIG. 2 illustrates a machine 10 embodying the apparatus for the present invention for sealing a hem in a moving web of film with an intermittent heat seal. A moving web of film 20 is formed from an extruded tube of polyethylene which has been slit on the side facing the viewer in FIG. 2 and folded on the other side to form two opposing layers of film. This moving web 20 enters the machine 10 through rollers 21, 22, 23 and 24, with the roller 23 having punch elements which form the holes for grasping the tape.

The hem forming apparatus illustrated in FIG. 2 includes supporting structure F having two folding surfaces 26 and 27 which are flat and converge outwardly from the feed rollers 21-24 to a point of maximum separation at 28 and then converge inwardly to a point of close separation adjacent the hem sealing apparatus 30. The folding surface 26, FIG. 2, includes a lower hem plate 31 and an upper hem plate 33. The other surfaces 27 includes a lower hem plate 36 and an upper hem plate 38. The bottom plate 34 is triangularly shaped having its base along the line 28 in FIG. 2 and its apex adjacent the upper end of the hem plates 33 and 38.

When the web 20 impinges on the surfaces 26 and 27, FIG. 2 the folded edge of the web 20 which is to form the bottom of the bags will pass over the bottom plate 34. A layer of the film passes over the outside of each of the surfaces 26 and 27 and the split edges of the film are tucked onto the other side of each surface to produce a hem in each opposing layer of film. The rollers 40, 41, FIG. 2 supported in relation to the hem plates 33 and 38 maintain the moving web of film tightly around the respective surfaces 26 and 27 and against the opposite sides thereof to avoid formation of wrinkles in the film during the heat sealing of the hems.

Slots, not shown, are provided in the lower hem plates 31 and 36, to receive the tapes T1 and T2 which are inserted into the hems of the moving web of film. A tape splitter 44 produces the two tapes T1 and T2 from a single tape T. The hem sealing apparatus 30 seals the folded over hem portion to the side panel of the bag so that the draw tape is secured in the hem of the bag. After the film leaves the hem sealing apparatus 30 it passes through nip rolls 46-48 and then through rolls 49 and 50 to the further processing steps of side sealing and cutting into individual bags. The present invention is concerned with the improved apparatus for sealing a hem with an intermittent heat seal in a moving web of film while the web is moving and preferably prior to the hem leaving the hem folding surface.

The heat sealing apparatus 30 comprises two similar sealing units, one mounted with respect to each of the upper hem plates 33 and 38, FIG. 2. As may be seen in FIG. 2 the sealing units of the heat sealing apparatus 30 are carried by adjustable brackets 51 which depend from a stationary bracket 52 secured to the top of the frame F. The adjustable brackets 51 are adapted to be moved into and out of operating position by means of actuators 53 in the form of air cylinders. When the brackets 51 are in the position shown in FIG. 4 the respective sealing units of the heat sealing apparatus 30 are in fixed position with respect to the upper hem plates 33 and 38. This is the normal operation position for the heat sealing units during the manufacture of the draw tape plastic bags. After the heat sealed hems leave the heat sealing apparatus 30 they pass between cooling members 54 which comprise a plurality of air jets for directing cooling air against the heat sealed areas of the seams to cool the seams so as to prevent stretching of the film as it is pulled over roll 45 and through rolls 46–50 to the further processing steps of side sealing and cutting into individual bags.

Figure 3:
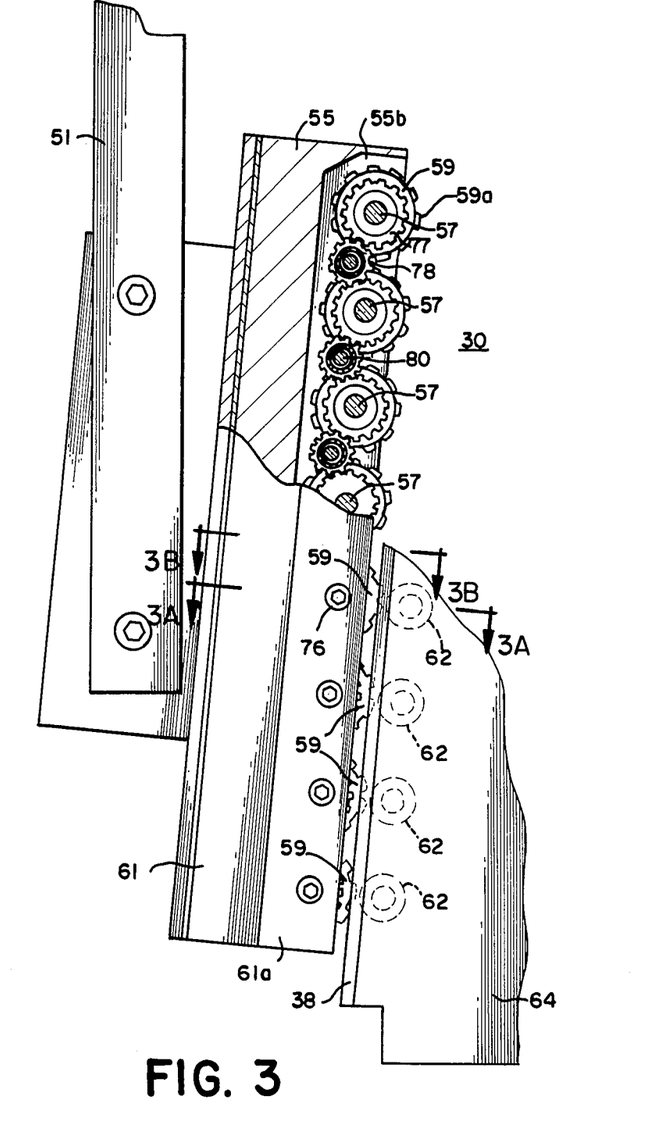
FIG. 3 is a fractional view on enlarged scale of the intermittent heat sealing portion of the machine shown in FIG. 2.
Figure 3A:
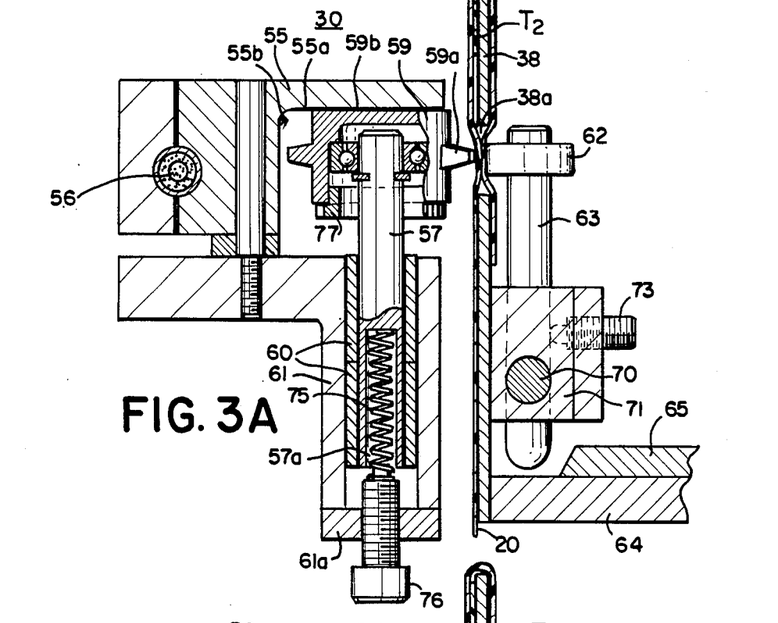
FIG. 3A is a fractional cross-sectional view on enlarged scale taken along the lines 3A—3A in FIG. 3.
Figure 3B:
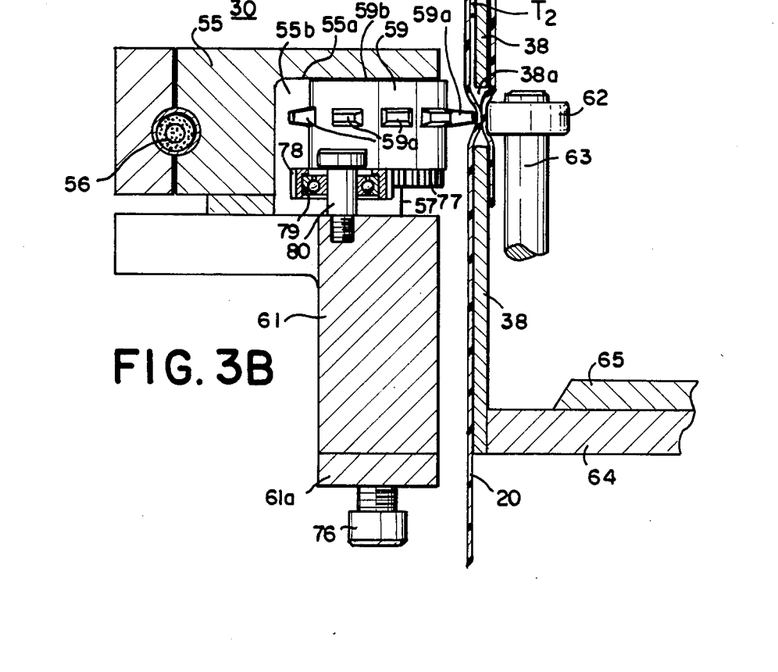
FIG. 3B is a fractional cross-sectional view taken along the lines 3B—3B in FIG. 3.

The details of one embodiment the intermittent heat sealing apparatus are best seen in FIGS. 3, 3A and 3B where they are illustrated in connection with the hem plate 38. As may be seen the heat sealing apparatus 30 includes a heating block or body 55 through which extends an electric heating element 56 which preferably is thermostatically controlled to control the temperature of the block 55. The block 55 is provided with a cavity 55b, FIG. 3, into which extend a plurality of shafts 57 on which are mounted ball bearings 58, FIG. 3A, and on which in turn are mounted wheels 59. Each of the wheels 59 is provided with an annular projection or rim 59a having a plurality of notches spaced around the periphery to provide spaced heat conducting surfaces the purpose of which will be hereinafter described. The shafts 57 are mounted in sleeve bearings 60 within a housing 61 having an end plate 61a. The housing 61 is mounted with respect to the hem plate 38 such that the projections 59a on the wheels 59 are in alignment with an extend into the slot 38a on the hem plate 38. Mounted at the opposite side of the hem plate 38 an in alignment with the slot 38a is a plurality of rubber rollers 62, one being shown in FIG. 3A, which are spring biased and are adapted to extend into the slot 38a and cooperate with the corresponding plurality of wheels 59 in heat sealing the hem in the web.

As may be seen in FIG. 2 the hem plates 33 and 38 are maintained in spaced relation by a plate 64 on which is mounted an adjustable wedge 65 which is adapted for vertical movement by an air cylinder (not shown). As may be see in FIG. 3A the sides of the wedge 65 are beveled and adapted to engage the ends of the shafts 63 which carry the wheels 62. The shafts 63 are carried by pivots 70 which in turn are carried by blocks 71 secured to the hem plates, as illustrated by hem plate 38 in FIG. 3A. The blocks 71 also are provided with spring loaded detents 73 which engage the shafts 63 for the rollers 62. The spring loaded detents are adjustable so as to vary the amount of spring loading on the shafts 63. When the wedge 65 is moved upwardly from its position shown in FIG. 3A, the wedge engages the ends of the shafts 63 causing the wheels 62 to be moved out of engagement with the web and thus out of the slot 38a. While the foregoing arrangement has been described in connection with the hem plate 38, it is to be understood that similar parts both for the heated wheels 59 and the rubber backup wheels 62 are utilized in connection with the other hem plate 33.

By the time the web of film 20 has moved upwardly over the folding surfaces 26 and 27, the layer of film moving over the surface 27 will have moved onto the folding plate 38 where the film is folded around the edge of the plate 38 to form a hem with a tape T2, FIG. 3A inserted therein as previously described. When the hem reaches the lower end of the sealing apparatus 30, FIGS. 2 and 3, the heat conducting surfaces or projections 59a on the heated or hot wheels 59 cooperate with the spring biased rubber wheels 62 to engage the opposite sides of the hem and form a heat seal longitudinally of the web.

The wheels 59 are heated by means of conduction from the heater block 55, the temperature of which is thermostatically controlled by the heating element 56, FIGS. 3A and 3B. As may be seen in FIG. 3A, the shaft 57 is provided with a bore 57a which is adapted to receive a compression spring 75. The end plate 61a has a threaded opening into which extends an adjustable screw 76 which is adapted to engage the end of the compression spring 75. The opposite end of the compression spring 75 engages the shaft 57 at the end of the bore 57a and thus by adjusting the screw 76 the compression the spring 75 can likewise be adjusted thereby forcing the shaft 57 in an upward direction as viewed in FIG. 3A. This causes the wheel 59 to have its flat end face 59b maintained in engagement with the inner wall 55a of the heater block 55. The force of the spring 75 maintains the face of the wheels 59 in contact with the heater block 55 thus ensuring heat transfer from the heater block 55 to each wheel 59. This adjustable screws 76 have the advantage of being able to minimize the longitudinal force applied to the shafts 57 while maintaining good thermal contact between the wheels 59 and the heater block 55. The heater block 55 is shaped to provide a housing for the wheels 59 to concentrate the heat around the wheels. As may be seen in FIG. 3 eight wheels 59 are utilized in sealing the hem. By using a plurality of heat sealing rollers or wheels 59, the heat required for sealing the hem can be delivered to the film in smaller increments since eight wheels are supplying the heat rather than one. If only one wheel were being utilized it would be necessary to heat the single wheel to higher temperature or to operate the speed of the film at a lower speed in order to complete the seal.

As pointed out above, the machine-direction intermittent heat seal 17 illustrated in FIG. 1 is made using a hot wheel sealer with notches cut around the periphery of the wheels. As shown in FIGS. 3, 3A and 3B each of the wheels 59 is provided with an annular projection or rim 59a having a plurality of notches spaced around the periphery. The notches are equally spaced on each of the wheels 59 so as to leave a plurality of projections or heat conducting surfaces in the rim 59a of equal length. For example as shown in FIG. 3 each of the wheels 59 have 12 notches in the rim leaving 12 equally spaced projections 59a. It is these portions of the rim 59a that engage the hem thus resulting in a discontinuous heat seal. In a preferred embodiment of the invention the discontinuous seal had seal lengths about ½" long with ¼" gaps. Since it is preferable to use multiple wheels for creating the intermittent heat seal the multiple wheels must be geared together to maintain register during a sealing operation. In other words each of the wheels 59 must be geared together so that the rims 59a will engage the same areas of the hem along the heat seal line so that the resulting seal will be a discontinuous or intermittent seal. If the multiple wheels 59, eight being shown in FIG. 3 for example, are not geared together so as to maintain register, it is not possible to control the intermittent seal areas in the hem. To accomplish the foregoing it will be seen that each of the wheels 59 is provided with a wheel gear 77 that is press fitted into the open end of the wheel 59. When pressing the wheel gear into the wheels 59, the teeth on the gear 77 are oriented with the projections in the rim 59a so that all of the wheels 59 and associated wheel gears 77 will have the same orientation. Each of the wheel gears 77 is adapted to mesh with intermediate gear 78, FIGS. 3 and 3B. Each of the intermediate gears 78 is carried by a bearing 79 which in turn is carried by a shoulder screw 80, the threaded end of which is screwed into the housing 61, FIG. 3B. With the multiple wheels 59 geared together in the foregoing manner the heat sealing portions 59a maintain register with the discontinuous or intermittent heat seal in the moving web of plastic film.

In accordance with the present invention hem seals were made using eight wheels, 1¼" diameter, in tandem, heated to a temperature of 300°–350° F. The wheels 59 were hard anodized aluminum having Teflon coated surfaces on the notched rims 59a and the sides or faces 59b of the wheels which engage the Teflon coated surfaces 55a on the aluminum block 55. The rims 59a had twelve notches and had a width of 3/32" across the projections. The eight backup rollers were ¾" diameter, 40-durometer natural rubber rollers, although silicone rubber may be preferred for durability. Since two hems are being sealed simultaneously (one for the front and one for the back of the bag) and since it is desirable to separate the layers of film as little as possible, the ¾" backup rolls 62 are alternated inside the opening between film layers, FIG. 2, so that every other roll 62 is used as the backup for the hot wheels 59 sealing the front of the bag, and alternate rolls are used for backup for the hot wheels 59 sealing the back of the bag. In that way, it is only necessary to separate the film layers by just over ¾". While a flat anvil backup means may be used in cooperation with the heated wheels, it has been found that the individual rubber rollers provides smoother seals.

Figure 4:
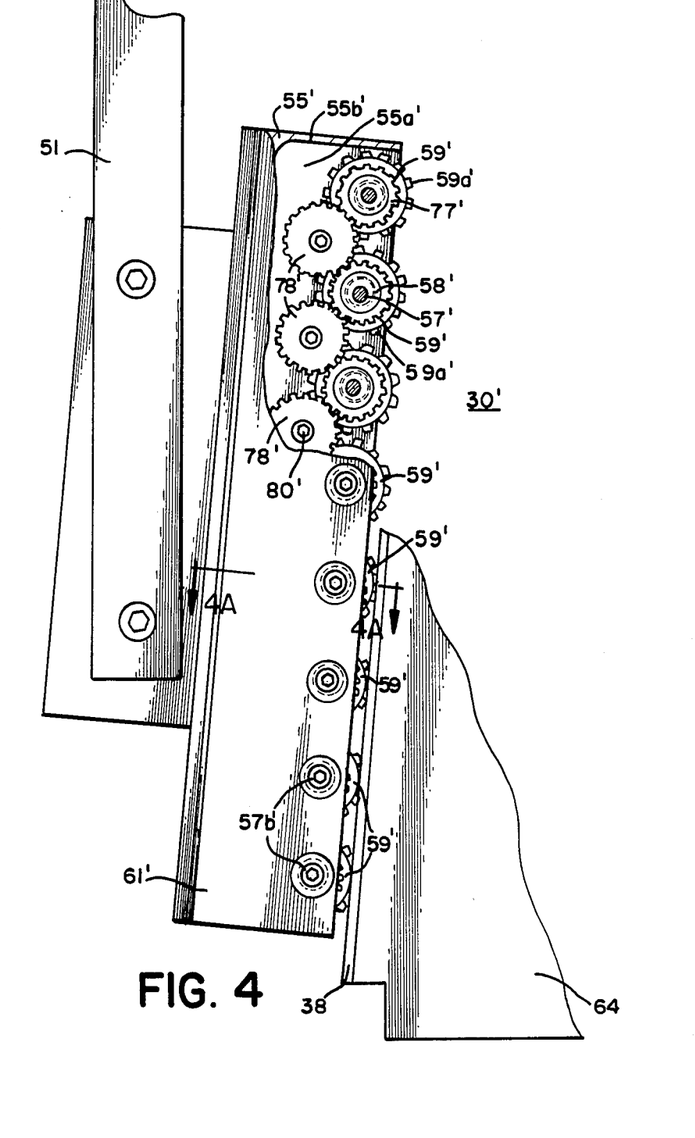
FIG. 4 is a fractional view on enlarged scale of a modification of the intermittent heat sealing apparatus embodying the present invention.
Figure 4A:
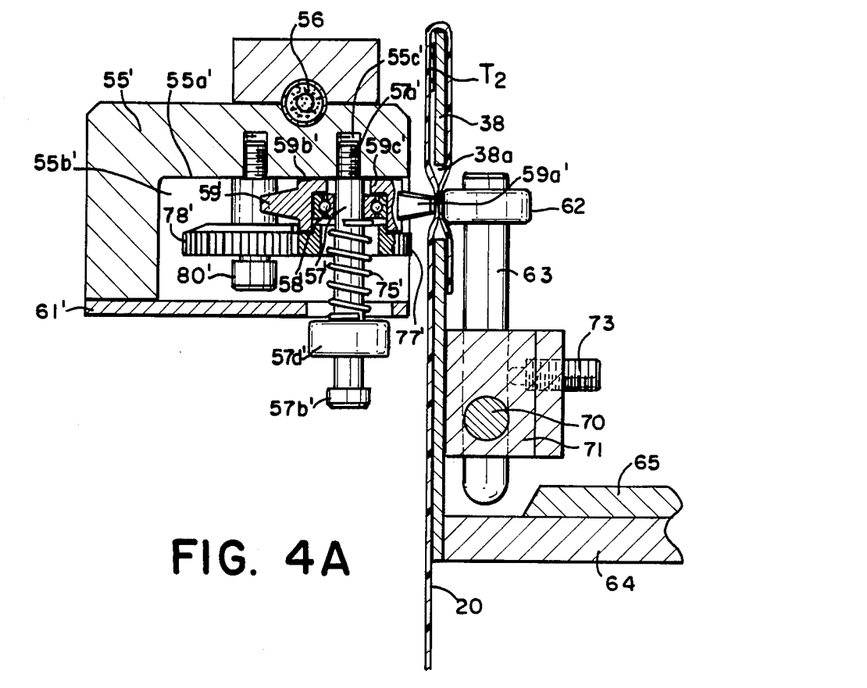
FIG. 4A is a fractional cross-sectional view taken along the lines 4A—4A in FIG. 4.

Referring to FIGS. 4 and 4A there is illustrated another embodiment of the heat sealing apparatus. The heat sealing apparatus 30' shown in FIGS. 4 and 4A is similar to the heat sealing apparatus shown in FIGS. 3, 3A and 3B. Corresponding parts have been provided with corresponding reference characters. The basic difference in the embodiment illustrated in FIGS. 4 and 4A is in the heat sealing unit and particularly the shape of the heater block 55' and the mounting for the heated wheels and associated gears 77' and 78'. As in the previous embodiment the wheels 59' are heated by means of conduction from the heater block 55', the temperature of which is thermostatically controlled by the electric heating element 56. It is to be understood that a plurality of heated rollers 59' are employed, preferably eight in number, as illustrated in FIG. 4. The block 55' is provided with a cavity 55b' and plurality of threaded openings 55c', FIG. 4A, into which extend the threaded ends 57a' of the corresponding number of shafts 57' on which are mounted ball bearings 58' and on which in turn are mounted on the rollers or wheels 59'. As may be seen in FIG. 4A the shaft 57' is in the nature of a shoulder screw having a head 57b' at one end and a threaded end 57a' at the other end which is adapted to be threaded into the opening 55c' of the heated block 55'. The threaded end 57a' extends through an opening 59c' in the end face 59b' of the heated wheel 59'. The heated wheel 59' has its face 59b' maintained against the corresponding face 55a' of the heated block by means of a compression spring 75' which is placed on the shaft 57' and is maintained between the head 57b' and the bearing 58'. The compression of the spring 75' can be adjusted turning the nut 57d' on the shaft 57' and thus vary the force of the heated wheel 59' against the heater block 55'.

As pointed out above, the machine-direction intermittent heat seal 17 illustrated in FIG. 1 is made using a hot wheel sealer with notches cut around the periphery of the wheels. As shown in FIGS. 4 and 4A each of the wheels 59' is provided with an annular projection or rim 59a' having a plurality of notches spaced around the periphery. The notches are equally spaced on each of the wheels 59a' so as to leave a plurality of projections in the rim 59a' of equal length. For example as shown in FIG. 4 each of the wheels 59' have 12 notches in the rim leaving 12 equally spaced projections 59a'. It is these portions of the rim 59a' that engage the hem thus resulting in a discontinuous heat seal. In a preferred embodiment of the invention the discontinuous seal had seal lengths about ¼" long with ¼" gaps. Since it is preferable to use multiple wheels for creating the intermittent heat seal the multiple wheels must be geared together to maintain register during a sealing operation. In other words each of the wheels 59' must be geared together so that the rims 59a' will engage the same areas of the hem along the heat seal line so that the resulting seal will be a discontinuous or intermittent seal. If the multiple wheels 59' are not geared together so as to maintain register, it is not possible to control the intermittent seal areas in the hem. To accomplish the foregoing it will be seen that each of the wheels 59' is provided with a wheel gear 77' that is press fitted into the open end of the wheel 59'. When pressing the wheel gear 77' into the wheels 59', the teeth on the gear 77' are oriented with the projections in the rim 59a' so as that all of the wheels 59' and associated wheel gears 77' will have the same orientation. Each of the wheel gears 77' is adapted to mesh with an intermediate gear 78', FIGS. 4 and 4A. Each of the intermediate gears 78' is carried by a bearing (not shown) which in turn is carried by a shoulder screw 80', the threaded end of which is screwed into the block 55', FIG. 4A. It will be seen in FIG. 4A that the wheels 59' and the gears 77' and 78' are contained with the block cavity 55b' which in turn is covered by a shield plate 61'. With the multiple wheels 59' geared together in the foregoing manner the heat sealing portions 59a' maintain register with the discontinuous or intermittent heat seal in the moving web of plastic film.

The heater block 55' and the heated wheels 59' are preferably made of hard anodized aluminum and have Teflon coated surfaces as previously described in connection with FIGS. 3, 3A and 3B. The other parts illustrated in FIG. 4A including the backup roller 62 are the same as those illustrated in the embodiment shown in FIG. 3A and thus it is believed not necessary to repeat their description here.

Figure 5:
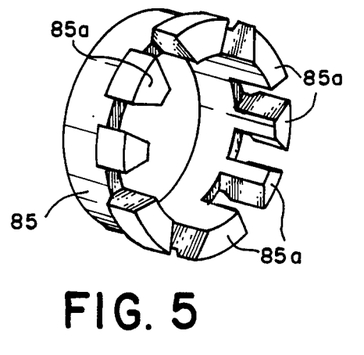
FIG. 5 is a perspective view of a heat insulating ring adapted for assembly with the hot wheel sealer illustrated in FIGS. 3A and 3B.
Figure 5A:
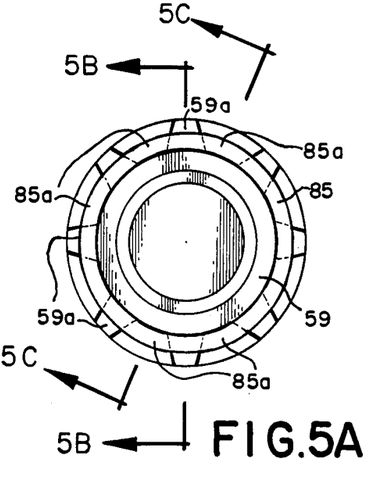
FIG. 5A is an end view of an assembly of the heat insulating ring and hot wheel sealer.
Figure 5B:
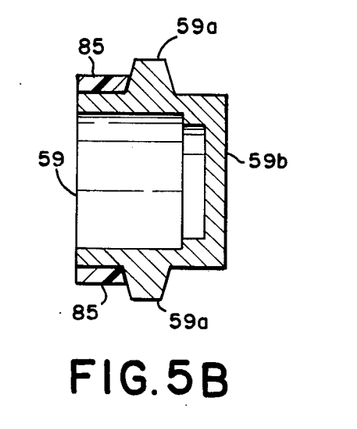
FIG. 5B is a sectional view taken along the lines 5B—5B in FIG. 5A.
Figure 5C:
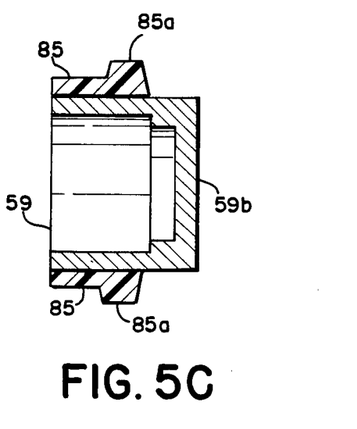
FIG. 5C is a sectional view taken along the lines 5C—5C in FIG. 5A.

While the invention thus far has been described in connection with hot wheels having a plurality of notches spaced around the periphery in the rim to provide the spaced heat conducting surfaces 59a on the wheels 59, there is illustrated in FIGS. 5, 5A, 5B and 5C a modification where the notches in the rim 59a are filled with heat insulating material so that the rim will present a continuous surface when engaging the hem in the web. As shown in FIGS. 5 and 5A there is illustrated a ring 85 having a plurality of projections 85a which are adapted to fill the notches between the projections 59a on the hot wheel 59 shown in FIGS. 3, 3A and 3B. The ring 85 preferably is molded from a suitable heat insulating material such as a phenolic resin and the ring 85 is adapted to be pressed over the open end of the wheel 59, FIGS. 5A–5C, with the projections 85a fitting into the notches in the rim 59a of the wheel 59.

Thus the rim on the wheel 59, FIGS. 5A, will present a continuous surface against the hem of the web; however, the rim will comprise a plurality of metal heat conducting surfaces 59a spaced from each other by a corresponding number of heat insulating surfaces 85a on the ring 85. The spaced heat conducting surfaces 59 on the rim of the wheel 59 will provide the intermittent heat seal in the hem; however, since the periphery of the wheel is continuous it presents a smooth circumferential surface when engaging the hem of the web. While the ring 85 has been illustrated in FIGS. 5, 5A, 5B and 5C in connection with the hot wheel 59, it is to be understood that it is equally applicable for assembly with the hot wheel 59' illustrated in FIGS. 4A.

While the present invention has been described in connection with a bag making machine of the type disclosed in the present application, it is to be understood that the apparatus for producing a machine-direction intermittent heat seal embodying the present invention may be utilized in other bag making machines and in other applications for sealing a hem in a moving web of film.

What is claimed is:

1. Apparatus for producing a machine-direction intermittent heat seal in opposing layers of thermoplastic film in a hem in a moving web of thermoplastic film comprising:
    a block supported on one side of the hem,
    a plurality of wheels having heat conducting surfaces spaced around the periphery and mounted on said block at spaced locations in tandem in the direction of web movement for engaging one of the opposing layers of film at intermittent locations along the path of the hem in the direction of web movement, said block having a corresponding plurality of surfaces each of which is engaged by a side of one of said wheels,
    gear means interconnecting said wheels to maintain said wheels in register with the intermittent portions of the heat seal in the hem during rotation of said wheels,
    means for heating said block and its plurality of surfaces,
    means for maintaining said wheels in contact with said plurality of surfaces on said block for heating said wheels by conduction from said block, and
    means supported on the opposite side of the web comprising a plurality of back-up rollers for engaging the opposing layer of film in the hem and cooperating with said plurality of heated wheels to press together the opposing layers of film in the hem, said plurality of heated wheels and said plurality of back-up rollers being freely rotatable whereby movement of the web through the heat sealing apparatus causes said plurality of heated wheels and said plurality of back-up rollers to rotate and heat seal the opposing layers of film in the hem at the intermittent locations along the path of the hem in the direction of web movement to produce the intermittent heat seal in the hem.

2. Apparatus according to claim 1 wherein said wheels are each provided with a rim projecting radially from each wheel and said rim having a width corresponding to the width of the seal to be formed in the hem, said rim having spaced notches around the periphery for producing the intermittent heat seal.

3. Apparatus according to claim 2 including a ring of heat insulating material filling said spaced notches in said rim and separating said heat conducting surfaces to provide a smooth circumferential surface on said rim.

4. Apparatus according to claim 1 wherein said plurality of back-up rollers are each provided with a rubber surface for cooperating with said rim on said heated wheels.

5. Apparatus according to claim 1 wherein said wheels are provided with a rim projecting radially from each wheel, said rim having a plurality of notches filled with heat insulating material to separate the plurality of spaced heat conducting surfaces in said rim and provide a smooth circumferential surface, and said rim having a width corresponding to the width of the intermittent heat seal to be formed in the web.

6. In a machine for making bags having front and back panels from thermoplastic film, apparatus for heat sealing a pair of hems with intermittent heat seals in a moving web of the thermoplastic film, each of the hems comprising folded opposing layers of the web in the front and back panels, comprising:
    a first support means supported on one side of one of the hems,
    a plurality of first wheels having heat conducting surfaces spaced around the periphery and mounted on said first support means at spaced locations in tandem in the direction of web movement for engaging one of the layers of film in the one hem at intermittent locations along a first path in the direction of web movement,
    gear means interconnecting said first wheels to maintain said plurality of first wheels in register with the intermittent locations of the heat seal in the one hem during rotation of said first wheels,
    a second support means supported on one side of the second hem,
    a plurality of second wheels having heat conducting surfaces spaced around the periphery and mounted on said second support means at spaced locations in tandem in the direction of web movement for engaging one of the layers of film in the second hem at intermittent locations along a second path in the direction of web movement,
    second gear means interconnecting said second wheels to maintain said plurality of second wheels in register with the intermittent locations of the heat seals in the second hem during rotation of said second wheels,
    means for heating each of said plurality of wheels, and
    means supported between the pair of hems comprising a plurality of back-up rollers for engaging the other layers of film in the hems and cooperating with the pluralities of heated wheels to press together the opposing layers of film in each of the hems, said back-up rollers being alternated so that every other back-up roller is used as the back-up for the heated wheels sealing the hem on the front of the bag and alternate back-up rollers are used for the back-up of the heated wheels sealing the hem on the back of the bag to minimize separation distance between the hems during the heat sealing operation,
    said pluralities of heated wheels and said plurality of back-up rollers being freely rotatable whereby movement of the web through the heat sealing apparatus causes the pluralities of heated wheels and the plurality of back-up rollers to rotate and heat seal the opposing layers of the web at the intermittent locations in the pair of hems along the respective paths in the direction of web movement to produce the intermittent heat seals in the hems.

7. In a machine for making bags having front and back panels from thermoplastic film, apparatus for heat sealing a pair of hems with intermittent heat seals in a moving web of the thermoplastic film, each of the hems comprising folded opposing layers of the web in the front and back panels, comprising:

a first block supported on one side of one of the hems, a plurality of first wheels having heat conducting surfaces spaced around the periphery mounted on said first block at spaced locations in tandem in the direction of web movement for engaging one of the layers of film in the one hem at intermittent locations along a first path in the direction of web movement, said first block having a corresponding plurality of surfaces each of which is engaged by a side of one of said first wheels, gear means interconnecting said first wheels to maintain said plurality of first wheels in register with the intermittent locations of the heat seal in the one hem during rotation of said first wheels, a second block supported on one side of the second hem, a plurality of second wheels having heat conducting surfaces spaced around the periphery and mounted on said second block at spaced locations in tandem in the direction of web movement for engaging one of the layers of film in the second hem at intermittent locations along a second path in the direction of web movement, said second block having a corresponding plurality of surfaces each of which is engaged by a side of one of said second wheels, second gear means interconnecting said second wheels to maintain said plurality of second wheels in register with the intermittent locations of the heat seals in the second hem during rotation of said second wheels, means for heating each of said blocks and the respective plurality of surfaces, means for maintaining each of said plurality of wheels in contact with their respective plurality of surfaces on said blocks for heating said wheels by conduction from said blocks, and means supported between the pair of hems comprising a plurality of back-up rollers for engaging the other layers of film in the hems and cooperating with the pluralities of heated wheels to press together the opposing layers of film in each of the hems, said back-up rollers being alternated so that every other back-up roller is used as the back-up for the heated wheels sealing the hem on the front of the bag and alternate back-up rollers are used for the back-up of the heated wheels sealing the hem on the back of the bag to minimize separation distance between the hems during the heat sealing operation, said pluralities of heated wheels and said plurality of back-up rollers being freely rotatable whereby movement of the web through the heat sealing apparatus causes the pluralities of heated wheels and the plurality of back-up rollers to rotate and heat seal the opposing layers of the web at the intermittent locations in the pair of hems along the respective paths in the direction of web movement to produce the intermittent heat seals in the hems.

* * * * *